United States Patent
Takei et al.

(10) Patent No.: US 10,190,785 B2
(45) Date of Patent: Jan. 29, 2019

(54) DUST REMOVING DEVICE AND METHOD FOR REMOVING DUST

(71) Applicant: Panasonic Intellectual Property Management Co., Ltd., Osaka (JP)

(72) Inventors: Ichiro Takei, Tokyo (JP); Hiroyuki Kayama, Osaka (JP); Hiroki Taoka, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 415 days.

(21) Appl. No.: 14/938,574

(22) Filed: Nov. 11, 2015

(65) Prior Publication Data
US 2016/0150925 A1    Jun. 2, 2016

(30) Foreign Application Priority Data
Nov. 28, 2014    (JP) .................................. 2014-241750

(51) Int. Cl.
*F24F 3/16*    (2006.01)
*B01D 46/44*    (2006.01)
(Continued)

(52) U.S. Cl.
CPC .......... *F24F 3/1603* (2013.01); *B01D 46/442* (2013.01); *F24F 11/79* (2018.01);
(Continued)

(58) Field of Classification Search
CPC ... B01D 46/442; F24F 2011/0023; F24F 3/16; F24F 11/0034; F24F 11/0078; F24F 2011/0035; F24F 2120/12; F24F 11/79
(Continued)

(56) References Cited

U.S. PATENT DOCUMENTS 8,734,578 B2 *    5/2014  Miki ..................... F24F 1/0007
                                                                    454/192

FOREIGN PATENT DOCUMENTS

JP    2004-174356    6/2004
JP    2007-003091    1/2007

OTHER PUBLICATIONS

Yasunori Saito "Laser-induced Fluorescence Lidar for the Use of Monitoring Multiple Environmental Components Surrounding the Livingsphere" The Review of Laser Engineering, vol. 39, No. 8, The Laser Society of Japan, Aug. 2011, pp. 590-595.

* cited by examiner

*Primary Examiner* — Robert Clemente
(74) *Attorney, Agent, or Firm* — Greenblum & Bernstein, P.L.C.

(57) ABSTRACT

A dust removing device includes: a dust position estimating unit which estimates a position of a dust area which is an area in which there is dust; an air blow determining unit which determines, based on the estimated position, an air blow mode which causes a predetermined airflow in the dust area; an air blower which performs an air blow in the determined air blow mode; and an air intake unit which takes in air from a space in which the air blow is performed. Note that the dust removing device may include an information storage which stores a control table in which air blow control information defining the air blow mode is written for a position of each dust area, and the air blow determining unit may determine, based on the control table, the air blow mode in accordance with the air blow control information corresponding to the estimated position of the dust area.

18 Claims, 9 Drawing Sheets

(51) Int. Cl.
*F24F 11/79* (2018.01)
*F24F 120/12* (2018.01)
*F24F 110/64* (2018.01)

(52) U.S. Cl.
CPC ....... *F24F 2110/64* (2018.01); *F24F 2120/12* (2018.01); *Y02A 50/25* (2018.01)

(58) Field of Classification Search
USPC .................................................. 55/DIG. 29
See application file for complete search history.

FIG. 8

| AIR BLOW DIRECTION OF SECOND AIR BLOW (HORIZONTAL ANGLE, VERTICAL ANGLE) | X-AXIS COORDINATE OF DUST PEAK POSITION | | | | |
|---|---|---|---|---|---|
| | LESS THAN −110 | −110 TO −40 | −40 TO 40 | 40 TO 110 | 110 OR MORE |
| 560 OR MORE | (10, −2.5) | (2.5, −5) | (0, −5) | (−2.5, −5) | (−10, −2.5) |
| 490 TO 560 | (2.5, −2.5) | (2.5, −2.5) | (0, −5) | (−2.5, −2.5) | (−2.5, −2.5) |
| 420 TO 490 | (5, 0) | (2.5, 2.5) | (0, 0) | (−0.5, −2.5) | (−5, 0) |
| 350 TO 420 | (−5, −5) | (5, 0) | (0, 0) | (−5, 0) | (−5, −5) |
| 280 TO 350 | (10, −5) | (7.5, −2.5) | (0, 0) | (−7.5, −2.5) | (−10, −5) |
| 210 TO 280 | (10, −10) | (10, −5) | (0, 0) | (−10, −5) | (−10, −10) |
| 140 TO 210 | (15, −10) | (10, −10) | (−10, 2.5) | (−10, −10) | (−15, −10) |
| 70 TO 140 | (20, −15) | (20, −15) | (−15, 2.5) | (−20, −15) | (−20, −15) |
| LESS THAN 70 | (20, −15) | (20, −15) | (−20, 5) | (−20, 5) | (−20, −15) |

DUST REMOVING DEVICE AND METHOD FOR REMOVING DUST

BACKGROUND

1. Technical Field

The present disclosure relates to a dust removing device which removes dust attached to a person or an object or dust floating in air, and relates to a method for removing dust.

2. Description of the Related Art

In PTLs 1 and 2, for example, there are proposed techniques as a technique for removing dust (hereinafter, referred to as "dust removal") which is attached to a person or an object or is floating in air.

In the technique described in PTL 1, air taken in through an air intake port provided on a side of a main body case facing a person or through a movable air inlet device connected to the main body case is cleaned by a filter in the main body case and is blown out from an air discharge hole provided on a rear side of the main body case. With this arrangement, in the technique described in PTL 1, an airflow is generated on a surface on which dust is attached; thus, the dust is separated from the person and is removed.

In the technique described in PTL 2, air cleaned by a filter is sent (blown out) to an entire air shower room, and the air in the air shower room is taken in. With this arrangement, a stronger airflow is generated on a surface on which dust is attached; thus, the dust is separated from a person and is removed.

CITATION LIST

Patent Literatures

PTL 1: Unexamined Japanese Patent Publication No. 2004-174356
PTL 2: Unexamined Japanese Patent Publication No. 20073091

Non-Patent Literature

NPL 1: Yasunori Saito, "Laser-induced Fluorescence Lidar for the Use of Monitoring Multiple Environmental Components Surrounding The Livingsphere," The Review of Laser Engineering, Vol. 39, No. 8, The Laser Society of Japan, August 2011, PP. 590-595

However, with the technique described in PTL 1, it is difficult to generate a strong airflow on a surface on which dust is attached, and thus it is difficult to effectively remove the dust. Further, the technique described in PTL 2 can be applied when an air shower room is installed or can be applied only to a specific (special) environment in which an air blow can be performed relatively strongly to the entire room. Therefore, it is desired to provide a technique with which dust can be easily and effectively removed.

SUMMARY

Thus, a non-limiting exemplary embodiment of the present disclosure provides a dust removing device and a method for removing dust with which dust can be easily and effectively removed.

In one general aspect, the techniques disclosed here feature a dust removing device including: a dust position estimator which estimates a position of a dust area in which there is dust: an air blow determiner which determines, based on the estimated position of the dust area, an air blow mode which causes a predetermined airflow in the dust area; an air blower which performs an air blow in the determined air blow mode; and an air intake which takes in air from a space in which the air blow is performed.

With this disclosure, dust can be easily and effectively removed.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF THE DRAWINGS

FIG. 8 shows an example of contents of a control table in the second exemplary embodiment.

DETAILED DESCRIPTION

In the following, exemplary embodiments of the present disclosure will be described in detail with reference to the drawings.

First Exemplary Embodiment

A first exemplary embodiment of the present disclosure is an example of a specific aspect of the present disclosure.

Figure 1:
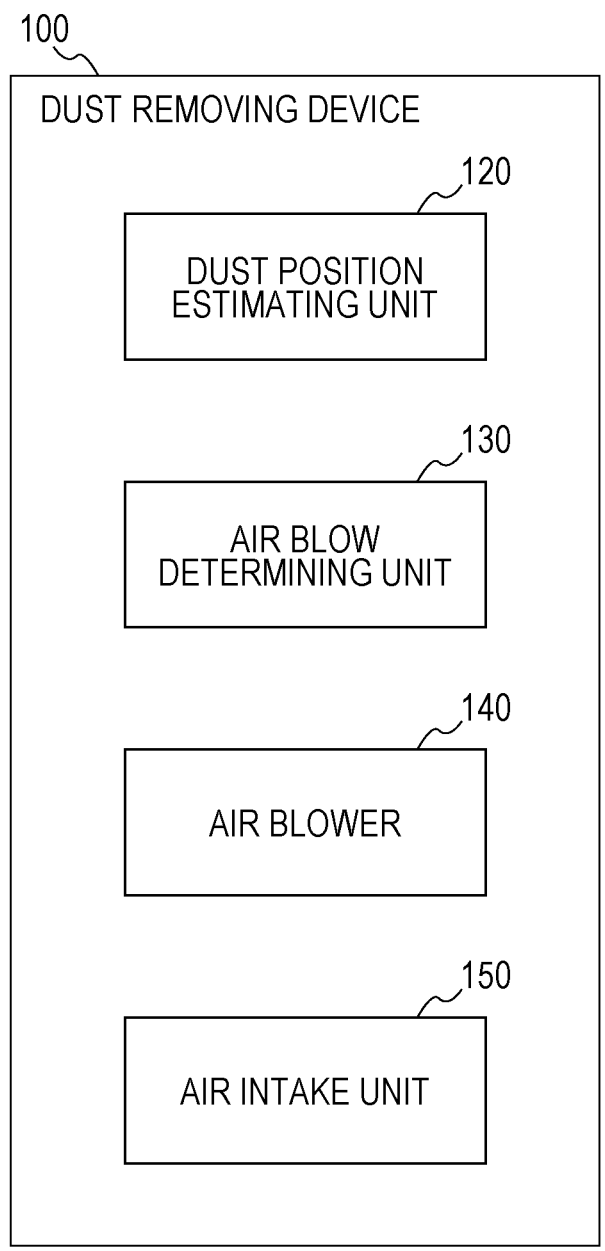
FIG. 1 shows an example of a configuration of a dust removing device according to a first exemplary embodiment of the present disclosure.

FIG. 1 is a block diagram showing an example of a configuration of a dust removing device according to the present exemplary embodiment.

With reference to FIG. 1, dust removing device 100 includes dust position estimating unit 120, air blow determining unit 130, air blower 140, and air intake unit 150.

Dust position estimating unit 120 estimates a position of a dust area which is an area in which there is dust.

Air blow determining unit 130 determines, based on the estimated position, an air blow mode which causes a predetermined airflow in the dust area.

Air blower 140 performs an air blow in the determined air blow mode.

Air intake unit 150 takes in air from a space in which the air blow is performed.

Although not shown in the drawings, dust removing device 100 includes, for example, a CPU (Central Processing Unit), a storage medium such as a ROM (Read Only Memory) storing a control program, a working memory such as a RAM (Random Access Memory), and a communication circuit. In addition, although not shown in the drawings, dust removing device 100 includes, for example, an air fan and an air outlet port which can be controlled by the above CPU. In this case, functions of the above-mentioned units are realized by a control program being executed by the CPU.

With such dust removing device 100, dust can be easily and effectively removed.

Second Exemplary Embodiment

A second exemplary embodiment of the present disclosure is an example of a case that an area having a high dust concentration is detected to determine an air blow mode.

<An Exterior Appearance of the Dust Removing Device and How the Device is Used>

First, there will be described an exterior appearance of a dust removing device according to the present exemplary embodiment and how the device is used.

Figure 2:
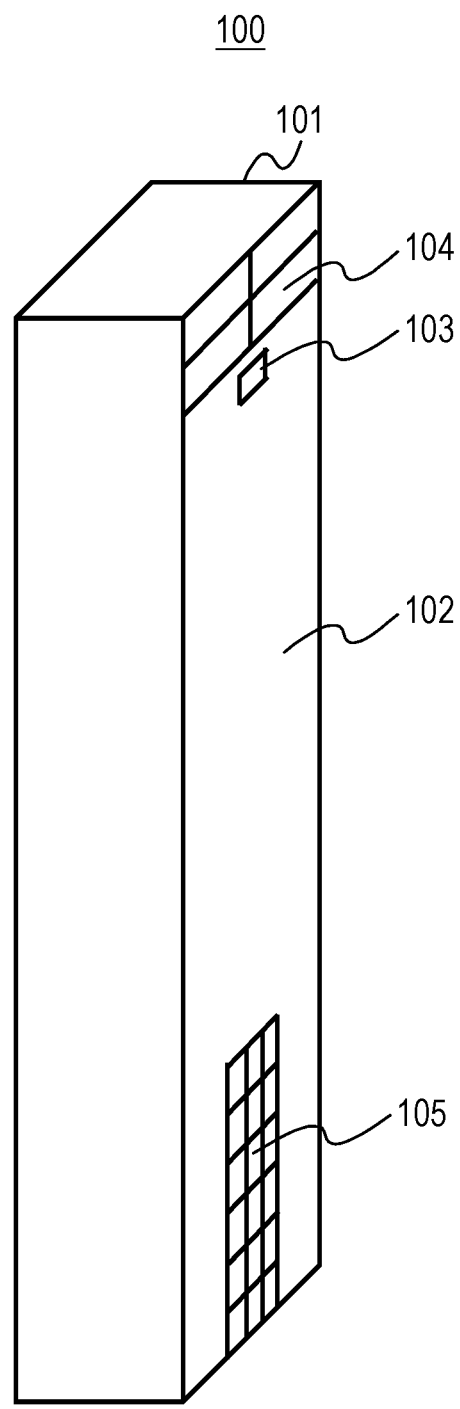
FIG. 2 is a perspective view showing an example of an exterior appearance of a dust removing device according to a second exemplary embodiment of the present disclosure.

FIG. 2 is a perspective view showing an example of an exterior appearance of the dust removing device according to the present exemplary embodiment.

As shown in FIG. 2, dust removing device 100 includes outer case 101 sensing unit 103 provided on an upper part of principal surface 102 of outer case 101, outlet port 104 provided at an uppermost part of principal surface 102, and inlet port 105 provided on a lowermost part of principal surface 102.

Outer case 101 is a casing about 2 meters (m) in height, 50 centimeters (cm) in width, and 20 centimeters (cm) in depth, for example. In outer case 101, although not shown in the drawings, there are equipped with a duct and an air fan which transfer air from inlet port 105 to outlet port 104 and an air filter which removes dust from the air being transferred.

Sensing unit 103 is a light emitter and a light receiver of a sensor which detects a position of a person or concentrations of dust (hereinafter, appropriately referred to as a "dust concentration") in air in different places by using light, for example. As such a sensor, there can be employed, for example, a known non-contact temperature sensor and a sensor described in NPL 1, in which dust in air is detected by analyzing a fluorescence spectrum of light from a target object when the target object is irradiated with laser light.

Outlet port 104 is, for example, a horizontally long louver equipped with resin blades in each of the horizontal direction and the vertical direction. The blades of outlet port 104 can be adjusted in angle by an electric motor (not shown). In other words, outlet port 104 can be adjusted in an air blow direction.

Inlet port 105 is, for example, a vertically long louver equipped with resin blades in each of the horizontal direction and the vertical direction. The length of Inlet port 105 in the vertical direction is 50 centimeters, for example. Note that it is preferable that each of the blades of inlet port 105 is adjustable in angle for fine adjustment or the like.

Note that dust removing device 100 in the present exemplary embodiment is a full circulation type device in which the above duct and air fan transfer all of the air taken in through inlet port 105 to outlet port 104.

Figure 3:
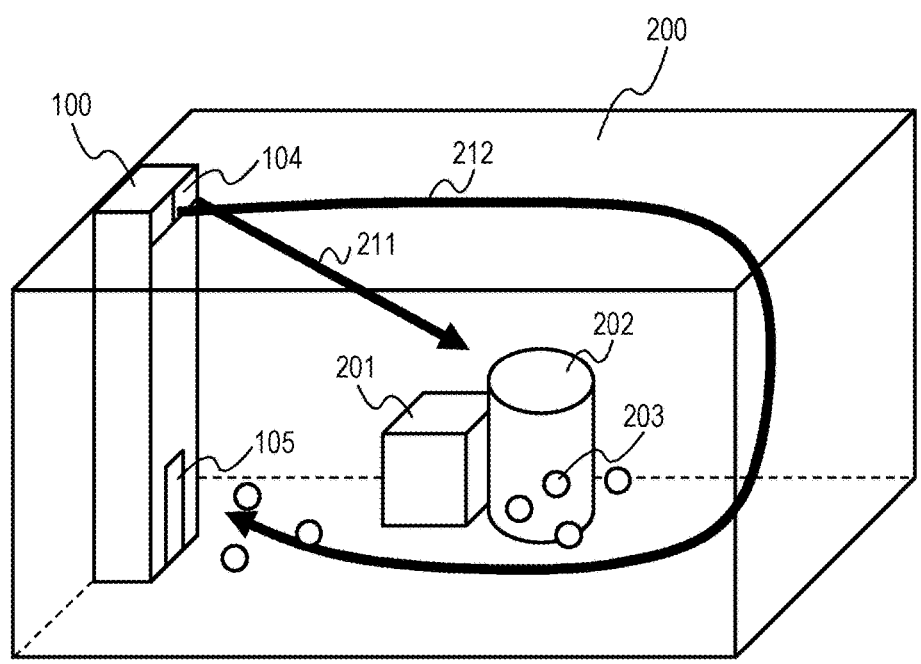
FIG. 3 shows an example of the dust removing device according to the second exemplary embodiment in a use state.

FIG. 3 is a diagram showing an example of dust removing device 100 in a use state.

As shown in FIG. 3, dust removing device 100 is installed close to a wall of room 200 with principal surface 102 facing a central side of room 200, for example.

Suppose that, in room 200, there is disposed furniture 201 and that person 202 is standing at a position behind furniture 201 when viewed from dust removing device 100. In this case, dust removing device 100 first performs first air blow 211 and next performs second air blow 212 from outlet port 104 by operations of function units to be described later.

First air blow 211 is an air blow which generates a predetermined airflow on the surface of hair, clothes, or the like of person 202 so as to separate dust 203 attached to person 202 from person 202 and to disperse dust 203 in surrounding air. First air blow 211 is an air blow which is air blown to the position of person 202, for example.

Second air blow 212 is an air blow which leads dust 203 separated from person 202 and dispersed in the periphery to inlet port 105 while inlet port 105 is taking in air from room 200. Second air blow 212 is an air blow which is air blown, in the direction to the vicinity of person 202, to the wall in room 200 opposed to the wall in front of which dust removing device 100 is installed, for example.

Note that, the "dust" in the present exemplary embodiment is a substance, in a fine particle shape, such as dust, pollen, sand, ash, and the like which is likely to attach to the surface of a person or the surface of an object and which is likely to float in air, and which is preferably removed from a predetermined area in room 201 or the like.

Dust removing device 100 as described above can remove, from room 200, dust 203 in room 200 including the dust attached to person 202.

Note that, in the following description, an area in which there is dust 203 is referred to as a "dust area." For example, when dust 203 is attached to person 202, the position of person 202 is the dust area, and when dust 203 is dispersed in air, an area in which a dust concentration is higher than in other areas in room 200 is the dust area.

In the present exemplary embodiment, the "dust area" refers to an area which is on a plane area 30 cm above a floor of room 200 and in which the dust concentration is highest.

<Configuration of the Dust Removing Device>

There will be described a configuration of dust removing device 100 to realize the dust removing device 100 as described above.

Figure 4:
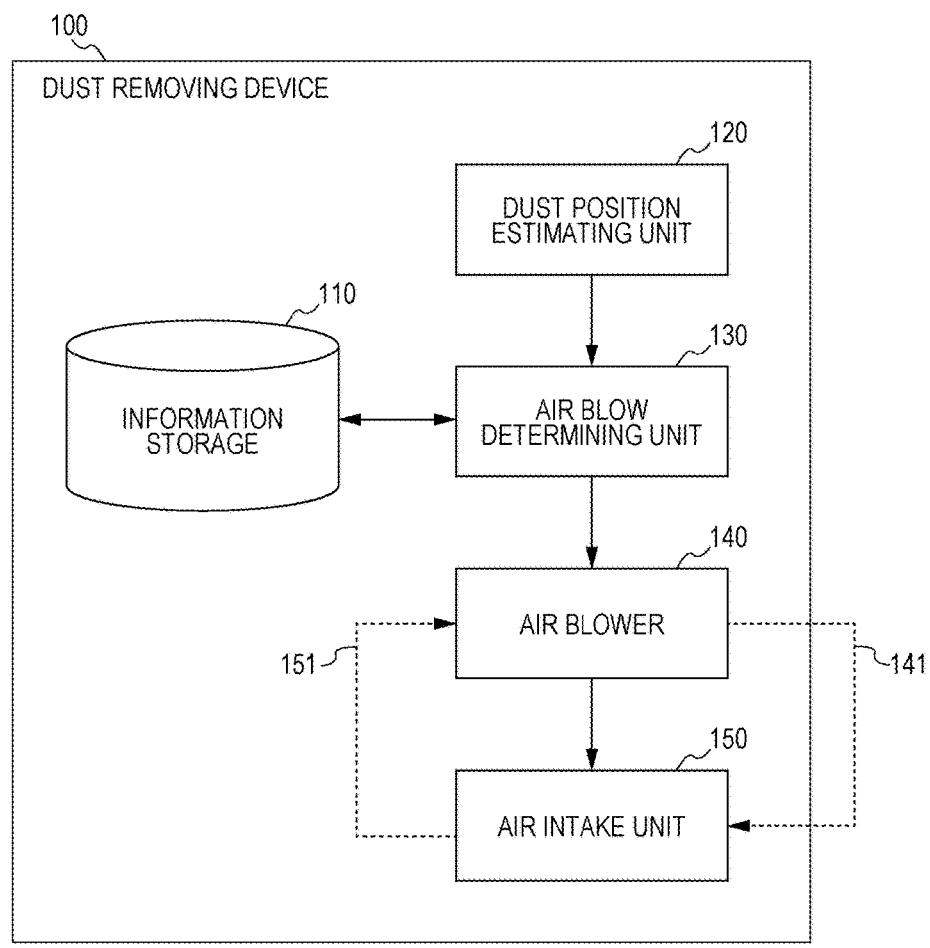
FIG. 4 shows an example of a configuration of the dust removing device according to the second exemplary embodiment.

FIG. 4 is a block diagram showing an example of the configuration of dust removing device 100.

With reference to FIG. 4, dust removing device 100 includes information storage 110, dust position estimating unit 120, air blow determining unit 130, air blower 140, and air intake unit 150.

Information storage 110 previously stores a control table in which air blow control information is written for a position of each dust area. Here, the air blow control information is information which defines an air blow mode which causes a predetermined airflow in the dust area. The predetermined airflow is an airflow which leads dust floating in a dust area to air intake unit 150 while air intake unit 150 (see FIG. 2) is taking in air, for example. The control table will be described in detail below.

Note that the air blow mode is a combination of a direction, a strength, a timing, and a length of time of an air blow. In the present exemplary embodiment, the strength, the timing, and the length of time of an air blow is the same regardless of the position of the dust area.

Dust position estimating unit 120 detects local area states (hereinafter, referred to as "local states") related to dust concentrations in different places and estimates the position of the dust area, based on the detected local state. In more detail, dust position estimating unit 120 includes the above sensor equipped with sensing unit 103 (see FIG. 2) and detects a three-dimensional position of a person. Then, dust position estimating unit 120 outputs information indicating the detected three dimensional position (hereinafter, referred to as a "person's position") to air blow determining unit 130.

Further, dust position estimating unit 120 detects, besides the person's position, the dust concentrations in different places on a plane area (hereinafter, referred to as a "dust detection target area") 30 cm above the floor of the room and determines, from the detection result, a position (hereinafter, referred to as a "dust peak position") at which the dust concentration is highest in the dust detection target area. Then, dust position estimating unit 120 outputs information indicating the determined dust peak position to air blow determining unit 130.

Note that the timing at which dust position estimating unit 120 detects dust concentrations is when a predetermined time (for example, three seconds) has elapsed since the first air blow was performed. That is to say, the timing is when the dust attached to a person has dispersed in the vicinity due to the airflow generated by the first air blow.

Air blow determining unit 130 determines a first air blow mode which causes a predetermined airflow at the person's position, based on the person's position indicated by the information having been input from dust position estimating unit 120. The predetermined airflow is an airflow strong enough to separate the dust attached to the person from the person, for example. Then, air blow determining unit 130 instructs air blower 140 to perform the first air blow in the determined air blow mode.

In the present exemplary embodiment, air blow determining unit 130 determines the direction to the person's position as the first air blow direction. The first air blow strength and the length of time are constant.

Air blow determining unit 130 also determines the second air blow direction in accordance with the air blow control information corresponding to the dust peak position indicated by the information having been input from dust position estimating unit 120, based on the control table stored in information storage 110. Then, air blow determining unit 130 instructs air blower 140 to perform the second air blow in the determined direction.

Air blower 140 performs, according to the instruction from air blow determining unit 130, the first air blow and the second air blow serially in the determined air blow mode. In more detail, air blower 140 includes outlet port 104 (see FIG. 2) and adjusts the angles of the blades to perform an air blow in a determined direction.

Note that, in the present exemplary embodiment, the above air fan is included in air intake unit 150. Therefore, when the angles of the blade have been adjusted for each of the first air blow and the second air blow, air blower 140 instructs air intake unit 150 to drive the air fan.

Air intake unit 150 takes in air from the space in which the air blow is performed by air blower 140. In more detail, air intake unit 150 includes inlet port 105 (see FIG. 2) and the duct, the air fan, and the air filter described above. Specifically, air intake unit 150 takes in air in the room according to the instruction from air blower 140, removes dust in the air, and then supplies air blower 140 with the air from which dust is removed, as indicated by arrow 151. The air supplied to air blower 140 is discharged from outlet port 104 into the room as indicated by arrow 141 and returns to inlet port 105 after circulating in the room as indicated by arrow 141.

Although not shown in the drawings, dust removing device 100 includes a CPU, a storage medium such as a ROM storing a control program, a working memory such as a RAM, and a communication circuit, for example. Operations of outlet port 104 and the above air fan are controlled by the CPU. In this case, functions of the above components are realized by the control program executed by the CPU.

Dust removing device 100 having the above configuration can locally generate strong airflows on the surfaces of the head hair and the clothes of a person, and can generate an airflow which effectively removes from inside the room dust separated from the person.

<Details of the Control Table>

Next, the control table will be described in detail.

As described above, the control table is the table in which the air blow control information defining the air blow mode is written for the position of each dust area, wherein the air blow mode causes a predetermined airflow in the dust area. The content (air blow direction) of each piece of the air blow control information written in the control table is determined based on an experiment, for example.

Figure 5:
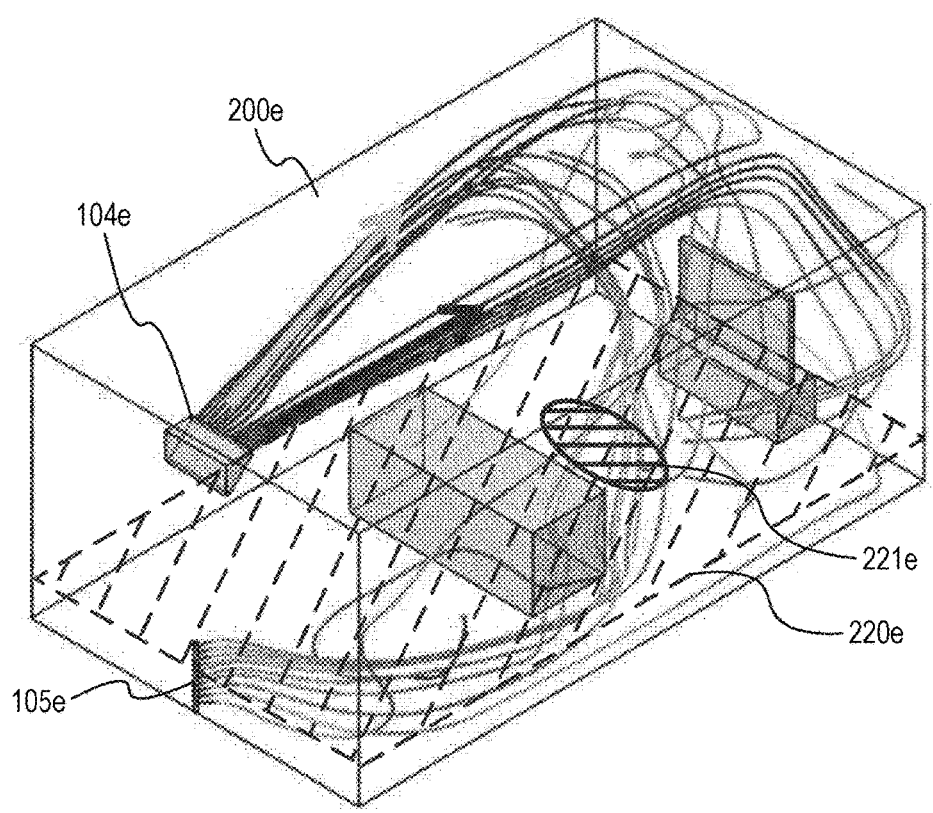
FIG. 5 shows an example how a control table is generated in the second exemplary embodiment.

FIG. 5 is a diagram showing an example of how an experiment for generating the control table is conducted.

As shown in FIG. 5, the experiment is conducted with experimental air outlet port 104e representing outlet port 104 of dust removing device 100 and experimental inlet port 105e representing inlet port 105 of dust removing device 100 arranged in experimental room 200e representing the room.

First, the dust areas (for example, area 221e in the drawing) are generated at various positions in a plane area (hereinafter, referred to as an "experimental dust detection target area") 220e 30 cm above the floor of experimental room 200e corresponding to the dust detection target area. For example, dust is sprinkled to be floating in the aft at random, and the dust peak positions in experimental dust detection target area 220e are then detected by using an experimental dust position estimating unit (not shown) corresponding to dust position estimating unit 120 of dust removing device 100.

Figure 6:
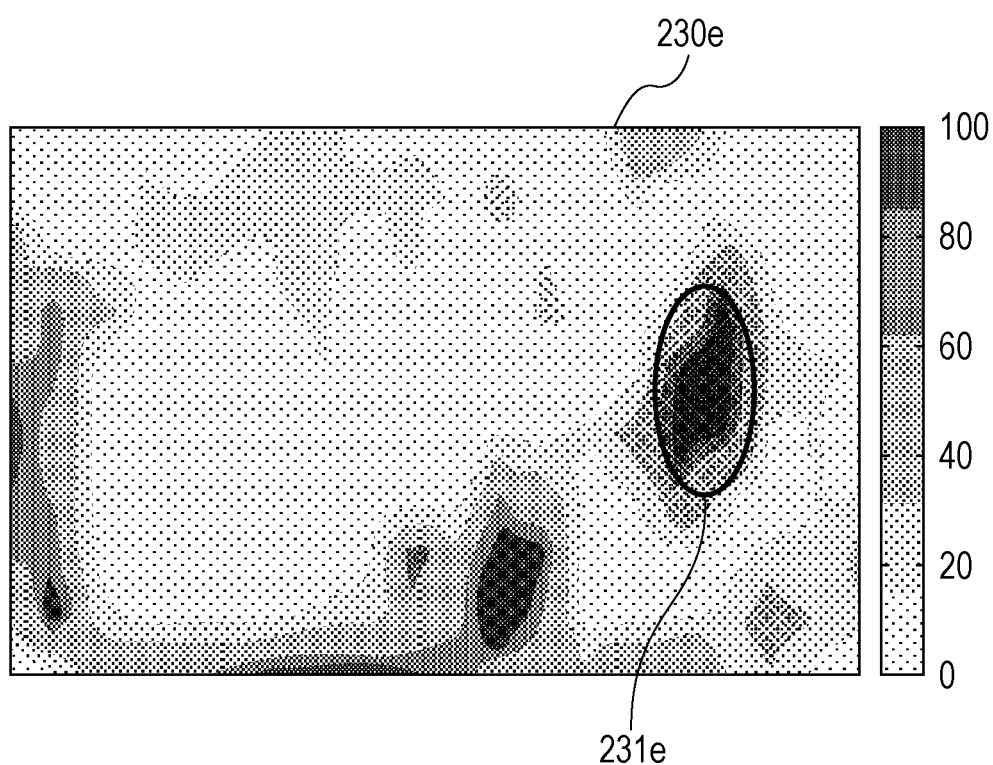
FIG. 6 shows an example of a dust concentration map in the second exemplary embodiment.
Figure 7A:
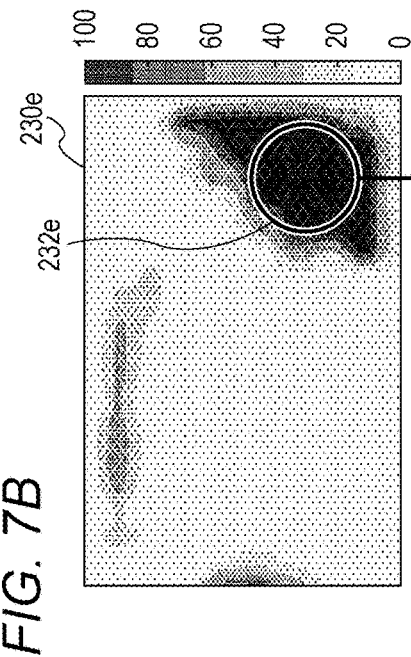
FIGS. 7A to 7D each show an example of a dust peak position and an appropriate air blow direction in the second exemplary embodiment.
Figure 7B:
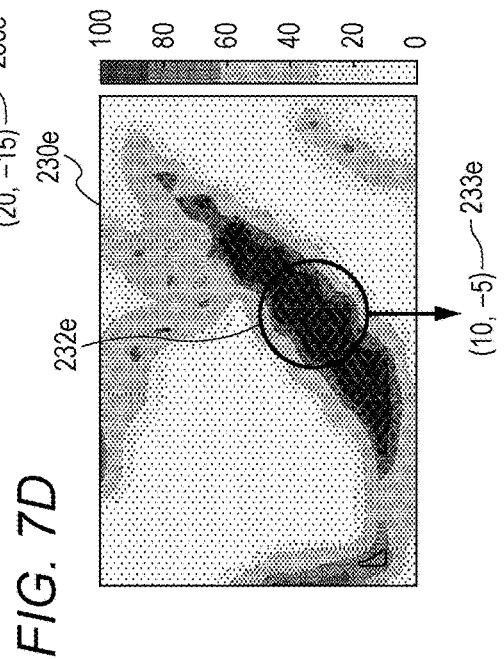
Figure 7C:
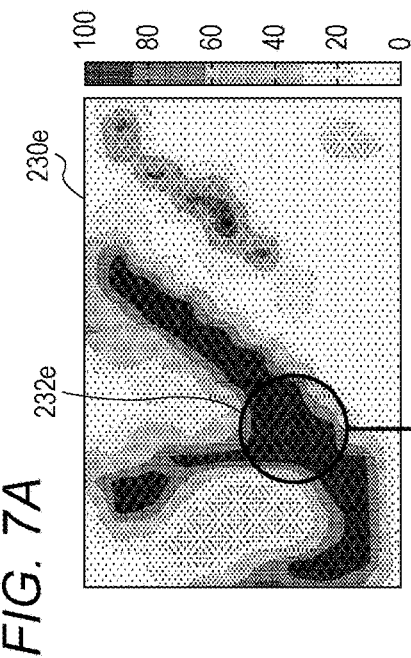
Figure 7D:
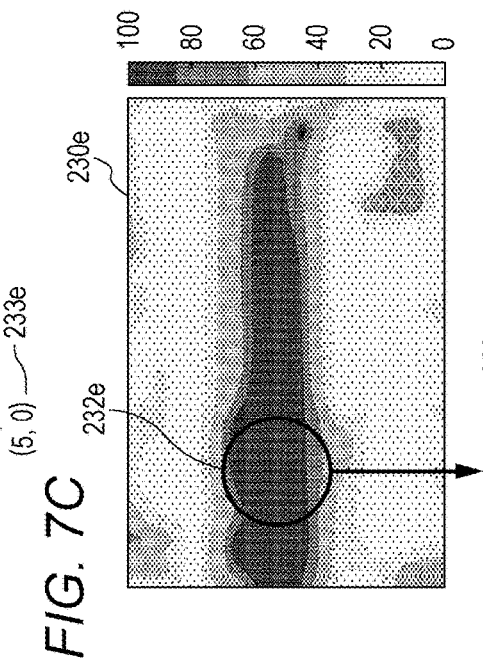

FIG. 6 is a diagram showing an example of a map (hereinafter, referred to as a "dust concentration map") showing a distribution of dust concentration in experimental dust detection target area 220e. In the drawing, the horizontal axis corresponds to the depth direction of the room when viewed from outlet port 104 and inlet port 105, and the vertical axis corresponds to the direction perpendicular to the depth direction of the room.

As shown in FIG. 6, in dust concentration map 230e, the value in area 231e corresponding to the dust area (area 221e) is higher than in other areas in experimental dust detection target area 220e. Therefore, the experimental dust position estimating unit determines this area 231e as the dust peak position.

The dust peak position is defined by values in the orthogonal coordinate system which is set with the position and the orientation of experimental air outlet port 104e as a reference, for example. Such coordinate system is configured with, for example, a Y-axis which has a positive value in the horizontal depth direction of the room with the center of experimental air outlet port 104e as a reference and with an X-axis which has a positive value in the horizontally right direction when facing the room with the center of experimental air outlet port 104e as a reference.

A degree of dust removal is determined while varying the air blow direction to check how the air blow should be performed in order to efficiently lead the dust in the dust area to inlet port 105. The above check is performed for the position of each dust area while the position of the dust area is being changed, and thus the relationship between the dust peak position and the appropriate air blow direction can be determined.

The air blow direction is defined, for example, by the angle (hereinafter, referred to as a "horizontal direction angle") in the horizontal direction and the angle (hereinafter, referred to as a "vertical direction angle") in the vertical direction with respect to the direction which is the center of the adjustable range of the air blow direction of experimental air outlet port 104e.

FIGS. 7A to 7D are diagrams showing examples of the dust peak position and the appropriate air blow direction.

As shown in FIGS. 7A to 7D, appropriate air blow direction (a horizontal direction angle, a vertical direction angle) 233e is different depending on dust peak position 232e obtained from dust concentration map 230e. Dust peak positions 232e are set to cover all of the experimental dust detection target areas 220e, and each of appropriate air blow directions 233e is set for each position.

The control table is generated by writing thus specified air blow directions 233e as the air blow directions for the second air blow associated with dust peak positions 232e.

FIG. 8 is a diagram showing an example of contents of the control table. Here, the example is for the case that the target room is 6.2 meters in depth and 3.6 meters in width.

As shown in FIG. 8, in control table 310, air blow direction 313 of the second air blow is written for each combination of X-axis coordinate 311 of a dust peak position and Y-axis coordinate 312 of the dust peak position. By using such control table 310, dust removing device 100 can quickly specify the air blow direction appropriate to efficiently remove dust from the dust peak position, and can perform the second air blow in such an air blow direction.

Note that it is also possible to use reflection of an airflow on a wall or a ceiling so as to generate the airflow at the dust peak position. Therefore, air blow direction 313 of the second air blow does not have to be in alignment with the direction to the dust peak position.

Further, the control table may be generated through an experiment conducted, in a room in which dust removing device 100 is actually installed, using dust removing device 100. Furthermore, the control table may be generated based on the results of an airflow simulation instead of an experiment.

<Operation of the Dust Removing Device>

Next, operation of dust removing device 100 will be described.

Figure 9:
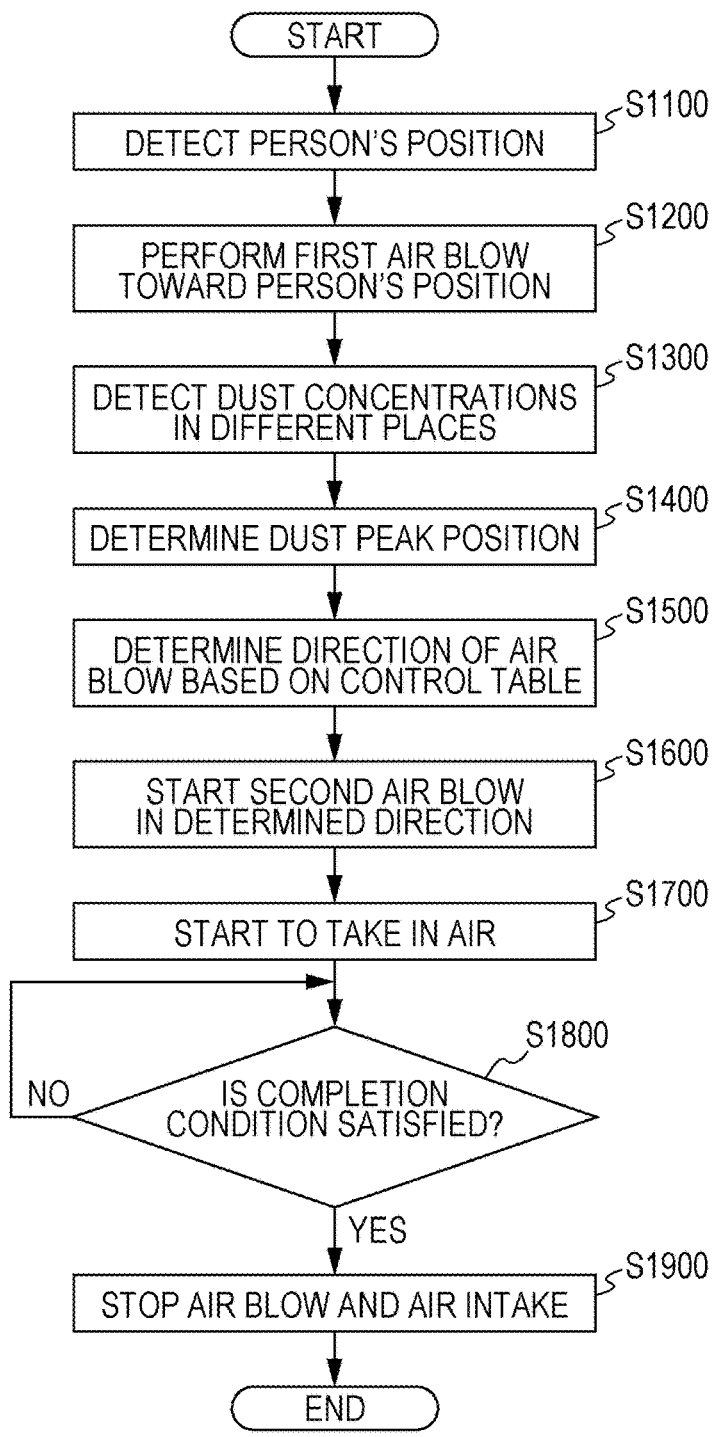
FIG. 9 is a flowchart showing an example of operation of the dust removing device according to the second exemplary embodiment.

FIG. 9 is a flowchart showing an example of the operation of dust removing device 100. Dust removing device 100 starts to perform the below described operation when an operation is conducted to activate dust removing device 100, when a person enters the room, or when dust is detected in a predetermined area in the room or in the taken-in air.

In step S1100, dust position estimating unit 120 detects a person's position.

In step S1200, air blower 140 performs the first air blow toward the detected person's position.

In step S1300, dust position estimating unit 120 detects the dust concentrations in different places in the dust detection target area.

In step S1400, dust position estimating unit 120 determines the dust peak position from the dust concentrations in the different places.

In step S1500, air blow determining unit 130 determines the second air blow direction, based on the determined dust peak position and control table 310 (see FIG. 8).

In step S1600, air blower 140 starts to perform the second air blow in the determined direction:

In step S1700, air intake unit 150 starts to take in air from the room. Note that, in the present exemplary embodiment, the process in step S1700 is performed simultaneously along with the process in step S1600.

In step S1800, air blow determining unit 130 determines whether the completion condition of the second air blow is satisfied. Such a completion condition is that, for example, a predetermined time period (for example, one minute) previously set for the second air blow has elapsed.

Air blow determining unit 130 repeatedly performs the determination process in step S1800 while the completion condition is not satisfied (step S1800: NO). If the completion condition is satisfied (step S1800: YES), air blow determining unit 130 proceeds the process to step S1900.

In step S1900, air blow determining unit 130 stops air blower 140 from blowing air and air intake unit 150 from taking in air, to complete the series of processes.

By the operation described above, dust removing device 100 can generate strong airflows on the surfaces of the head hair and the clothes of the person and then can generate the airflow which can efficiently remove from the room the dust separated from the person by the strong airflows.

Note that dust removing device 100 may periodically repeat the process in steps S1300 to S1800 every three seconds, for example. That is, dust removing device 100 may adaptively change the manner in which the second blow is performed while monitoring how the dust actually moves.

<Advantageous Effects of the Present Exemplary Embodiment>

As described above, dust removing device 100 according to the present exemplary embodiment estimates the position of the dust area, determines, based on the estimated position, the air blow mode which causes the predetermined airflow in the dust area, performs an air blow in the determined air blow mode, and takes in air, simultaneously during the air blow, from the space in which the air blow is performed. By this operation, dust removing device 100 can generate strong airflows on the surfaces of the head hair and the clothes of the person and further can generate the airflow which can efficiently remove from the room the dust separated from the person by the strong airflows.

That is to say, dust removing device 100 can effectively remove dust attached to a person. Further, because such dust removing device 100 locally generates a strong airflow only in a required place, dust removing device 100 can be also used in, for example, a hallway and a room in a house without specifically requiring an air shower room. Therefore, dust removing device 100 can more easily realize effective dust removal than the conventional art.

For example, pollen which causes pollen allergy is relatively heavy and is carried into a room, being attached to clothes of a person, and when the person walks, the pollen is separated from the clothes and falls down slowly in the air. The pollen which once reaches the floor usually does not fly up due to the weight of the pollen even when there is a little airflow; however, the pollen often flies up when a person walks. Further, the same thing goes for dust at a similar level to the pollen.

However, dust removing device 100 first performs the first air blow which generates an airflow at the person's position; thus, the dust such as pollen can be put in a state of being easily carried, and the dust can be efficiently suctioned and removed by the second air blow. Therefore, dust removing device 100 is preferable to remove pollen and dust similar to pollen.

<Other Examples of the First Air Blow Mode>

Note that the first air blow mode is not limited to the above example.

For example, air blow determining unit 130 determines the direction not to the head of a person but to the clothes of the person as the first air blow direction. This arrangement can prevent the person from feeling uncomfortable about a strong airflow generated on the head. In this case, dust position estimating unit 120 needs to detect the position of the clothes of the person separately from the position of the head.

In addition, the cause of the dust floating in the room can be not only separation of the dust attached to the person but also flying up of the dust staying on the floor due to walking of the person. Such flying up of the dust is caused in an area just after the person walks. Therefore, for example, dust position estimating unit 120 may determine as the person's position (position of the dust area) the area in which the person was located at a predetermined time (for example, in the latest one second).

In addition, for example, it is also possible to use reflection of an airflow on the wall or the ceiling so as to generate the airflow at the person's position. For this reason, air blow determining unit 130 does not have to set the first air blow direction in alignment with the direction of the person's position. Information storage 110 stores a control table in which is written air blow control information defining the first air blow mode for each position of a person, wherein the air blow control information is generated, for example, by an experiment or a simulation, similarly to the control table about the second air blow. Thus, air blow determining unit 130 determines, similarly to the second air blow, the first air blow mode, based on such a control table.

<Other Examples of How to Estimate the Dust Position>

The method for estimating the position of the dust area is not limited to the above examples.

For example, air blower 140 performs preliminary air blow, while varying the direction, so as to sweep the room before air blow determining unit 130 determines a second air blow mode. Dust position estimating unit 120 detects, for every direction of the preliminary air blow, the dust concentration of the air taken in by air intake unit 150 by using a dust concentration sensor disposed before the air filter, and determines as the position of the dust area the position corresponding to the direction in which the dust concentration is highest. Thus, air blow determining unit 130 determines as the second air blow direction the above direction in which the above dust concentration is highest.

In this case, the above control table is not necessary. However, dust removing device 100 may concurrently use the method in which dust removing device 100 detects the dust concentrations in different places in the room and determines the second air blow direction by using the control table.

Further, for example, dust position estimating unit 120 detects the dust concentration in an area other than the above dust detection target area or the entire room. In this case, it is preferable that the air blow control information is written in the control table such that the information covers the entire area in which the dust concentration is detected.

Further, for example, dust position estimating unit 120 may determine the person's position as the position of the dust area in which there is dust.

Further, dust removing device 100 may further include a statistic information obtaining unit (not shown) which obtains information in which positions of a person in the room are statistically recorded, and dust position estimating unit 120 may determine the position of a person estimated based on the statistically recorded information as the position of the dust area in which there is dust. For example, if a time period or a number of times when a person's existence is recorded is not less than a predetermined value, the position at which the existence of the person is recorded may be determined as the position of the dust area. Further, it is also possible to analyze statistic information in which behavior of a person is recorded and to determine as the position of the dust area the position at which behavior causing the flying up of dust is detected relatively frequently. For example, the behavior causing the flying up of dust may include behavior such as laying out and putting away futon (Japanese-style bedding), playing of a child, and eating and drinking. Note that dust removing device 100 may record the statistic information by itself or that dust removing device 100 may obtain the information recorded by an external device.

In this case, dust removing device 100 does not necessarily determine the second air blow and the second air blow mode. However, air intake unit 150 has to take in air from the space in which the first air blow is performed.

Further, for example, dust position estimating unit 120 detects the local state related to the dust concentration at positions other than the position at which the dust concentration is high and the person's position, and estimates the position of the dust area, based on the detected local state. Such a local state may include, for example: presence or absence of an object which tends to gather dust from a pet; and opening and closing a door through which dust tends to enter.

Further, for example, dust position estimating unit 120 determines whether an area is the dust area, by determining an object (for example, person) which tends to gather dust has entered into a specific area, for example, in a front face of dust removing device 100.

<Other Examples of the Determination Object>

The object of determination to be made based on the position of the dust area is not limited to the above example.

For example, air blow determining unit 130 determines, depending on the position of the dust area, at least one of the strength, the timing, and the length of time of the second air blow in addition to the second air blow direction or instead of the second air blow direction. Specifically, for example, air blow determining unit 130 increases the second air blow strength as the distance from outlet port 104 to a dust area is longer.

In this case, air blower 140 and air intake unit 150 (that is, air fan) need to be able to adjust the strength, the timing, and the length of time of the second air blow. In addition, in the control table, it is required that the strength, the timing, the length of time of the second air blow, which are the objects of determination, are written associated with the position of the dust area.

Note that there is a time lag after air is blown and before a predetermined airflow is formed, and there is a time lag after the air blow is terminated and before the predetermined airflow stops. For this reason, it is preferable that, in the control table, there are written the strength, the timing, the length of time of an air blow, and the like in which these time lags are taken into account.

<Other Examples of the Determination Method>

The method for determining the air blow mode, based on the position of the dust area is not limited to the above examples.

For example, information storage 110 stores a control table in which air blow control information defining the second air blow mode is written for each combination of a configuration pattern (an area, an arrangement of furniture, material of a floor, and the like) in the space and the position of the dust area. Air blow determining unit 130 obtains the configuration in the space in which the air blow is performed, through analyzing a stereo image made by imaging the space or by the operation by the user for inputting the arrangement of furniture, or the like; thus, air blow determining unit 130 obtains the configuration pattern in the space. Then air blow determining unit 130 determines, based on the control table, the second air blow mode according to the air blow control information corresponding to the combination of the obtained configuration pattern and the estimated position of the dust area.

Note that, in dust removing device 100, such a method for determining the air blow mode may be also applied to the first air blow. In addition, information storage 110 may store such a control table as shown in FIG. 8 for each configuration pattern in the space, Further, for example, information storage 110 may store, instead of the control table, a mathematical model such as a neural network in which an appropriate air blow mode is learned through an experiment for each combination of the configuration pattern in the space and the position of the dust area. In this case, air blow determining unit 130 calculates the appropriate air blow mode by inputting in the mathematical model a parameter representing the configuration in the space and the position of the dust area in which the air blow is performed.

Further, for example, air blow determining unit 130 calculates the airflow by simulation, based on the configuration in the space in which the air blow is performed, for each air blow mode and determines the air blow mode capable of efficiently removing dust. Then, air blow determining unit 130 determines the determined air blow mode as the second air blow mode.

In this case, the above control table is not necessary. However, dust removing device 100 may concurrently use the method in which the control table is used to determine the second air blow mode. Further, dust removing device 100 may concurrently use the method in which a preliminary air blow is performed to determine the second air blow mode.

Further, for example, air blow determining unit 130 determines the air blow mode, based on additional information such as the dust concentration of the dust area, the configuration in the space in which the air blow is performed, the strength of air blow and an air blow object set by an user operation. Specifically, for example, air blow determining unit 130 increases the second air blow strength as the dust concentration in the dust area is higher. In this case, air blow determining unit 130 needs to obtain the additional information. In addition, in the control table, the air blow mode needs to be written associated with the content of the additional information.

<Another Examples of the Object for Which an Airflow is Generated>

The object for which a predetermined airflow is generated by an air blow is not limited to the above example.

For example, in the case that the dust attached to the surface of a floor or the surface of furniture, dust position estimating unit 120 may determine the air blow mode so that a predetermined airflow is generated on the surface of the floor or the furniture.

<Other Examples of the Configuration of the Air Blower and the Air intake Unit>

The configurations of air blower 140 and air intake unit 150 are not limited to the above examples.

For example, outlet port 104 may be a nozzle shaped (cannon barrel) outlet port. Further, outlet port 104 for performing the first air blow and the outlet port for performing the second air blow may be different components. Further, air blower 140 may take in outdoor air to blow air, and air intake unit 150 may discharge the taken-in air to outside of the space in which the air blow is performed. In this case, the air filter does not have to be used. However, in these cases, it is preferable that each of air blower 140 and air intake unit 150 is equipped with an air fan.

Further, it is also possible that the blades of inlet port 105 can be adjusted in angle by an electric motor. In other words, inlet port 105 can be adjusted in the direction of air intake. In this case, it is preferable that air blow determining unit 130 determines the direction of air intake, in a similar way to the air blow direction, based on the position of the dust area so that dust can be efficiently carried.

Further, the arrangement of air blower 140 and air intake unit 150 is not limited to the above example. For example, air blower 140 and air intake unit 150 can be disposed away from each other in a left and right direction at the high positions on the ceiling or can be disposed at opposing positions on the opposite sides of the room.

<Other Modified Examples>

A part of the structure of above-described dust removing device 100 may be physically apart from the other parts of the structure of dust removing device 100. In this case, each of the structures needs to be equipped with a communication unit to communicate with each other.

<Summary of the Present Disclosure>

The dust removing device of the present disclosure includes: a dust position estimator which estimates a position of a dust area in which there is dust; an air blow determiner which determines, based on the estimated position of the dust area, an air blow mode which causes a predetermined airflow in the dust area; an air blower which performs an air blow in the determined air blow mode; and an air intake which takes in air from a space in which the air blow is performed.

The above dust removing device may include an information storage which stores a control table in which air blow control information defining the air blow mode is written for a position of each dust area, and the air blow determining unit may determine, based on the control table, the air blow mode in accordance with the air blow control information corresponding to the estimated position of the dust area.

In the above dust removing device, the air blow determining unit may determine, based on the estimated position, at least one of a first air blow mode which disperses the dust and a second air blow mode which leads the dispersed dust to the air intake unit, and the air blower may perform an air blow in the first air blow mode and then perform an air blow in the second air blow mode.

The above dust removing device may include an information storage which stores a control table in which air blow control information defining at least one of the first air blow mode and the second air blow mode is written, for each combination of a configuration pattern in the space and the position of the dust area, and the air blow determining unit may obtain the configuration pattern in the space in which the air blow is performed and determine, based on the control table, at least one of the first air blow mode and the second air blow mode in accordance with the air blow control information corresponding to the combination of the obtained configuration pattern and the estimated position of the dust area.

In the above dust removing device, the dust area may be an area in which a dust concentration is higher than in other areas in the space, and the dust position estimating unit may detect local states related to dust concentration in different places in the space and estimate the position of the dust area, based on the detected local states.

In the above dust removing device, the local state may be a dust concentration, and the dust position estimating unit may determine, as the position of the dust area, a position at which the dust concentration is not less than a predetermined threshold.

In the above dust removing device, the local state may be presence or absence of a person, and the dust position estimating unit may determine, as the position of the dust area, at least one of a position at which there is a person and a position at which the person was in a predetermined period of time.

In the above dust removing device, the air blower may perform preliminary air blow, while changing directions, before the air blow determining unit determines the air blow mode; the dust position estimating unit may detect a dust concentration of air taken in by the air intake unit for a direction of each preliminary air blow, and may determine, as the position of the dust area, a position which corresponds to the direction in which the detected dust concentration is highest; and the air blow determining unit may determine the direction of the air blow to be the direction in which the dust concentration is highest.

A method for removing dust of the present disclosure may include: estimating a position of a dust area which is an area in which there is dust; determining an air blow mode which causes a predetermined airflow in the dust area, based on the estimated position; performing an air blow in the determined air blow mode; and taking in air from a space in which the air blow is performed.

In the above exemplary embodiment, the description is made on an example in which the present disclosure is configured with hardware; however, the present disclosure can be realized by software in cooperation with hardware.

Further, the function block used in the description of the above exemplary embodiment can be realized typically by LSIs, which are integrated circuits. These function blocks may be integrated into one chip, or a part or the entire function blocks may be integrated into one chip. The integrated circuit may be called as an LSI here; however, the integrated circuit may be called as an IC, a system LSI, a super LSI, or an ultra LSI, depending on the degree of integration.

The present disclosure is useful as a dust removing device and a method for removing dust with which dust can be easily and effectively removed.

What is claimed is:

1. A dust removing device comprising:
a dust position estimator which estimates a position of a dusty area in which dust is present;
an air blow determiner which determines, based on the estimated position of the dusty area, an air blow mode which causes a predetermined airflow in the dusty area;
an air blower which performs an air blowing to cause airflow in the determined air blowing mode; and
an air intake which draws in air from a space in which the air blowing is performed,
wherein the air blowing mode includes a first air blowing mode, in which the air blower causes a first airflow to disperse dust, and a second air blowing mode, in which the air blower causes a second airflow, different from the first airflow, to lead the dispersed dust to the air intake,
in the first air blowing mode, the air blower causes the first airflow and the air intake does not draw in air, and
in the second air blowing mode, which is performed after the first air blowing mode is performed, the air blower causes the second airflow and the air intake draws in air, with the dispersed dust, from the space.

2. The dust removing device according to claim 1, further comprising an information storage which stores a control table which includes air blowing control information indicating the air blowing mode for each position of each potential dusty area,
wherein the air blow determiner determines the air blowing mode in accordance with the air blowing control information based on the estimated position of the dusty area by referring to the control table.

3. The dust removing device according to claim 1, further comprising an information storage which stores a control table that includes air blowing control information indicating at least one of the first air blowing mode and the second air blowing mode for each position of each potential dusty area in each potential configuration pattern in the space,
wherein the air blow determiner obtains a configuration pattern in the space in which the air blowing is performed and determines at least one of the first air blowing mode and the second air blowing mode in accordance with the air blowing control information based on the obtained configuration pattern and the estimated position of the dusty area by referring to the control table.

4. The dust removing device according to claim 1, further comprising a statistic information obtainer which obtains a statistically recorded position of a person,
wherein the dust position estimator detects the local state based on the statistically recorded position of the person.

5. The dust removing device according to claim 4, wherein the statistic information obtainer further obtains a statistically recorded behavior of the person, and the dust position estimator detects the local state based on the statistically recorded behavior triggering dust to fly up.

6. A dust removing device comprising:
a dust position estimator which estimates a position of a dusty area in which dust is present;
an air blow determiner which determines, based on the estimated position of the dusty area, an air blowing mode which causes a predetermined airflow in the dusty area;
an air blower which performs an air blowing in the determined air blowing mode; and
an air intake which draws in air from a space in which the air blowing is performed,
wherein the dust position estimator detects local states related to dust concentration in different places in the space, and estimates the position of the dusty area based on the detected local states,
the local state is a dust concentration, and
the dust position estimator determines, as the position of the dusty area, a position at which the dust concentration is not less than a predetermined threshold.

7. The dust removing device according to claim 6, wherein
the local state is a presence of a person, and
the dust position estimator determines, as the position of the dusty area, at least one of a position at which there is a person and a position at which the person was for a predetermined period of time.

8. The dust removing device according to claim 6, wherein
the air blower performs preliminary air blowing, while changing air blowing directions, before the air blow determiner determines the air blowing mode,
the dust position estimator detects a dust concentration of air drawn in by the air intake for a direction of each preliminary air blowing, and determines, as the position of the dusty area, a position which corresponds to the direction in which the detected dust concentration is highest, and
the air blow determiner determines the direction of the air blowing to be the direction in which the dust concentration is highest.

9. The dust removing device according to claim 6, further comprising a statistic information obtainer which obtains a statistically recorded position of a person,
wherein the dust position estimator detects the local state based on the statistically recorded position of the person.

10. The dust removing device according to claim 9, wherein the statistic information obtainer further obtains a statistically recorded behavior of the person, and the dust position estimator detects the local state based on the statistically recorded behavior triggering dust to fly up.

11. The dust removing device according to claim 6, further comprising an information storage which stores a control table which includes air blowing control information indicating the air blowing mode for each position of each potential dusty area,
wherein the air blow determiner determines the air blowing mode in accordance with the air blowing control information based on the estimated position of the dusty area by referring to the control table.

12. The dust removing device according to claim 6, further comprising an information storage which stores a control table that includes air blowing control information indicating at least one of a first air blowing mode and a second air blowing mode for each position of each potential dusty area in each potential configuration pattern in the space,
wherein the air blow determiner obtains a configuration pattern in the space in which the air blowing is performed and determines at least one of the first air blowing mode and the second air blowing mode in accordance with the air blowing control information based on the obtained configuration pattern and the estimated position of the dusty area by referring to the control table.

13. A method for removing dust, comprising:
estimating a position of a dusty area in which dust is present;
determining an air blowing mode which causes a predetermined airflow in the dusty area, based on the estimated position of the dusty area;
performing an air blowing in the determined air blowing mode; and
drawing in air from a space in which the air blowing is performed,
wherein the air blowing mode includes a first air blowing mode which disperses dust and a second air blowing mode which draws the dispersed dust to a location of the drawing in air intake, and
the air blowing in the second air blowing mode is performed after performing the air blowing in the first air blowing mode.

14. The method for removing dust according to claim 13, further comprising storing a control table which includes air blowing control information indicating the air blowing mode for each position of each potential dusty area, and
determining the air blowing mode in accordance with the air blowing control information based on the estimated position of the dusty area by referring to the control table.

15. The method for removing dust according to claim 13, further comprising storing a control table that includes air blowing control information indicating at least one of the first air blowing mode and the second air blowing mode for each position of each potential dust area in each potential configuration pattern in the space,
the determining comprising obtaining a configuration pattern in the space in which the air blowing is performed and determining at least one of the first air blowing mode and the second air blowing mode in accordance with the air blowing control information based on the obtained configuration pattern and the estimated position of the dusty area by referring to the control table.

16. The method for removing dust according to claim 13, wherein
the performing comprises performing a preliminary air blowing, while changing air blowing directions, before the determining determines the air blowing mode,
the estimating comprises detecting a dust concentration of air drawn in by the drawing for a direction of each preliminary air blowing, and determining, as the position of the dusty area, a position which corresponds to the direction in which the detected dust concentration is highest, and
the determining determines the direction of the air blowing to be the direction in which the dust concentration is highest.

17. The method for removing dust according to claim 13, further comprising obtaining a statistically recorded position of a person,
wherein the estimating detects the local state based on the statistically recorded position of the person.

18. The method removing dust according to claim 17, wherein the obtaining further obtains a statistically recorded behavior of the person, and the estimating detects the local state based on the statistically recorded behavior triggering dust to fly up.

* * * * *